United States Patent [19]

Kersten

[11] 4,245,948
[45] Jan. 20, 1981

[54] CORN SHELLING ATTACHMENT FOR COMBINES

[76] Inventor: Bernard Kersten, Rte. #1, Roberts, Wis. 54023

[21] Appl. No.: 2,943

[22] Filed: Jan. 12, 1979

[51] Int. Cl.³ .................... A01D 61/04; B65G 67/08
[52] U.S. Cl. .................................. 414/523; 56/14.6; 198/612
[58] Field of Search .................. 198/611, 612, 615; 56/14.6, 13.3, 13.5; 414/502–505, 518, 523, 528

[56] References Cited

U.S. PATENT DOCUMENTS

| | | | |
|---|---|---|---|
| 2,930,625 | 3/1960 | Kreider | 198/611 X |
| 3,195,711 | 6/1965 | Bogdan et al. | 198/612 |
| 3,370,695 | 2/1968 | Robson | 198/612 X |
| 3,559,384 | 2/1971 | Bernhardt et al. | 56/14.6 |
| 3,672,133 | 6/1972 | Mestad | 56/13.5 |
| 3,780,851 | 12/1973 | Bichel et al. | 56/14.6 X |
| 3,952,889 | 4/1976 | Wanker et al. | 56/14.6 X |
| 3,973,380 | 8/1976 | Knellman et al. | 56/14.6 |
| 4,149,642 | 4/1979 | Schneider | 414/523 |

*Primary Examiner*—Stephen G. Kunin
*Assistant Examiner*—Terrance L. Siemens
*Attorney, Agent, or Firm*—Merchant, Gould, Smith, Edell, Welter & Schmidt

[57] ABSTRACT

An auxiliary attachment which may be detachably coupled to the front end of a combine adjacent an inlet opening in the front end. The attachment includes a conveyor for conveying unshelled corn towards the inlet opening and a rotatable rotor for engaging and feeding that corn into and through the opening. The attachment serves to transport unshelled corn into the combine so that the corn shelling apparatus inside the combine can be used to shell dried corn. The attachment is meant to be coupled to the combine in place of the normal crop picking header thereon.

8 Claims, 4 Drawing Figures

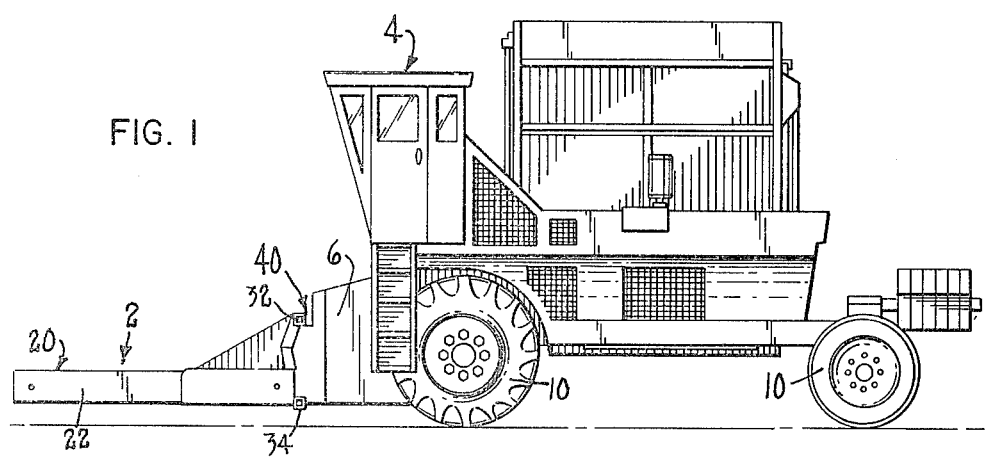
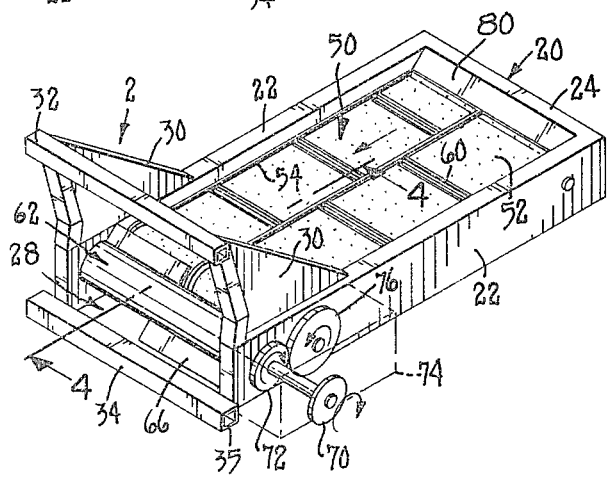
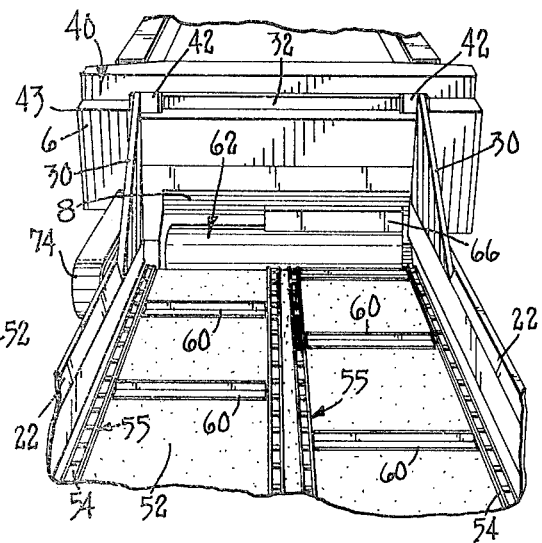
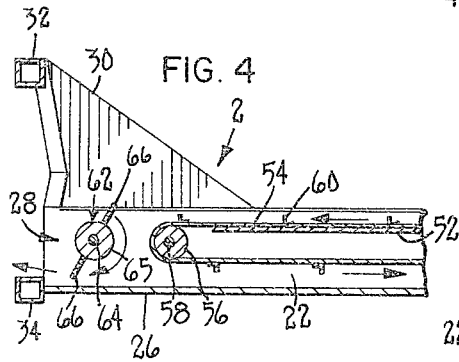

CORN SHELLING ATTACHMENT FOR COMBINES

TECHNICAL FIELD

This invention relates generally to the agricultural implement industry. More particularly, this invention relates to a removable attachment which may be quickly coupled to a combine for feeding "cob corn" to the combine for shelling of the corn.

DESCRIPTION OF THE PRIOR ART

Farming has changed a great deal in recent years. Today's farmer usually has a significant financial investment in the farm implement equipment. This is due partly to the increasing mechanization of farming and also to the increased cost of farm equipment because of price inflation. For example, a combine or harvester for harvesting crops now costs between $30,000–$100,000.

Obviously, the more expensive farm equipment becomes, the more difficult it is for the farmer to keep making the monetary investments which are required when purchasing new equipment. This is especially true since the economics of farming today indicate that farms have to become larger and larger to remain profitable. Such larger farms require the farmer to purchase either additional pieces or more sophisicated pieces of farm equipment. In such an environment, it would be to the farmer's advantage to have equipment which is interchangeable in the sense that it can do more than one job. The degree to which equipment can be used for other jobs will of course depend on the nature of those jobs.

One example of a piece of equipment which is somewhat underutilized is the conventional combine or harvester. Such a combine typically includes a detachable header such as a "corn head" or "grain head". The header includes a structure which severs the crops standing in the field and feeds those crops into the main body of the combine. The main body of the combine includes apparatus for treating the severed crop in a particular way. For example, many combines will actually shell the corn that has just been picked by the "corn head" and then deposit the shelled corn in a wagon or the like. Thus, the typical combine has a large corn shelling capability. However, the combine is normally used to shell corn only when harvesting corn in the field.

Corn which has been picked and shelled in the field by a combine must be dried before it can be marketed or otherwise used. This drying is usually accomplished by artifical means such as gas powered dryers or the like. With the increasing costs of all types of fuel, the use of artificial drying devices is becoming increasingly expensive. Thus, it is usually more advantageous to first pick the corn using the combine and then store the picked corn which is still on the cob, and which may be referred to as "cob corn", in a corn crib or the like where the corn can naturally dry. Once the corn has been thoroughly dried, it then can be shelled. This avoids the expense of using artifically powered dryers for drying corn which has been picked and shelled by the combine.

Corn which has been harvested and stored on the cob will usually be shelled by a separate piece of shelling machinery typically called a "sheller". It is the usual practice for a farmer to either purchase or rent a sheller even though the times during which corn will be shelled each year are somewhat limited. Furthermore, it is also the practice to use a separate sheller even though the combine itself is capable of shelling corn. However, as the price of renting or buying a sheller goes up, it becomes exceedingly apparent that the underutilization of the corn shelling capacity of the combine is an economic waste and a detriment to the farmer.

U.S. Pat. No. 3,672,133 to Mestad discloses a conveyor attachment for a combine. This attachment includes an auger conveyor which is fixed at one end to the header of the combine and rests at the other end on the ground. The conveyor serves to elevate the corn upwardly and dump that corn off at the upper end onto the header of the combine. The gathering chains of the header then carry the corn into the interior of the combine where the corn shelling mechanism of the combine is operative to shell the corn.

While the above-noted patent to Mestad does disclose an auxiliary attachment for more fully utilizing the corn shelling capacity of the combine, the equipment of Mestad has various disadvantages. In essence, Mestad simply discloses an elevator for elevating corn from a point of storage to a position above the header of the combine. The elevator deposits the corn on the header. This still requires that the header be attached to the front of the combine and that the header itself be operated to move the corn into the combine. Consequently, all the parts of the header must still be driven. This increases wear on the header and also adds to the power drain on the combine because of the need to power all the components of the header.

Mestad also discloses an embodiment in which the conveyor attachment can be attached to the front of the combine after the header has been removed. However, in this embodiment, the end of the conveyor attachment adjacent the end of the combine is built into a complicated hopper structure. The hopper is itself removably attached in the normal manner of a header. This structure is, however, unduly complicated and time consuming to attach. In addition, the hopper structure increases the expense and complexity of the apparatus.

SUMMARY OF THE INVENTION

Accordingly, one aspect of this invention is the provision of an auxiliary corn shelling attachment which is detachably connected to the front end of a combine in place of the normal header. The attachment is simple, inexpensive, and effects the feeding of corn into the combine in an efficient manner.

The corn shelling attachment of this invention comprises a frame having a conveyor mounted thereon. The conveyor moves corn from one end of the frame towards the other. A rotor having a plurality of paddle arms is rotatably mounted at one end of the frame adjacent the discharge end of the conveyor. The paddle arms of the rotor serve to sweep the corn directly and forceably into and through an inlet opening in the front of the combine. This inlet opening leads to the corn shelling mechanism located in the combine for shelling of the corn. The attachment is detachably connected to the front of the combine adjacent the end of the frame which contains the rotor.

BRIEF DESCRIPTION OF THE DRAWINGS

This invention will be described in detail hereafter in the Detailed Description, when taken in conjunction with the following drawings, in which like reference numerals refer to like elements throughout.

FIG. 1 is a side elevational view of a combine having the corn shelling attachment of this invention connected thereto;

FIG. 2 is a perspective view of the corn shelling attachment according to this invention;

FIG. 3 is a perspective view of the front of the combine as shown in FIG. 1, particularly illustrating the rear half of the corn shelling attachment and its method of attachment to the front of the combine; and FIG. 4 is a partial cross sectional view of the corn shelling attachment along the lines 4—4 of FIG. 2.

DETAILED DESCRIPTION

Referring first to FIG. 1, an improved auxiliary corn shelling attachment or apparatus according to this invention is generally illustrated as 2. Attachment 2 is detachably connected to the front end 6 of a combine or harvester which is generally illustrated as 4. The front end 6 of combine 4 can be elevated and lowered by any appropriate mechanism which is part of a conventional combine. In addition, various detachable headers or crop picking structures are usually coupled to front end 6. When the front end 6 is in a lower position, the crop picking mechanism serves to harvest the crop and carry that crop inwardly into the combine 4. However, when the front end 6 is elevated, the header mechanism is usually raised off the ground to allow the combine to be driven between one location and another. As shown in FIG. 1, the front end 6 is shown in a raised position.

The particular combine 4 shown herein is not important to the present invention which relates particularly to the structure of the auxiliary corn shelling attachment 2. Thus, any conventional combine may be used such as those manufactured by the New Holland division of the Sperry Rand Corporation. Typically, combine 4 will have suitable structure (not shown) in its interior for shelling corn, that is, for removing the corn kernels from the corn cob. In addition, a rectangular inlet opening or entrance 8 in the front end 6 of combine 4 operatively connects to the corn shelling apparatus in the interior of combine 4. Moreover, combine 4 is of course self powered and movable by virtue of ground engaging wheels 10. The structure of combine 4, however, is not relevant to this invention except insofar as it is part of the means for mounting the corn shelling attachment 2 to the front end 6 and insofar as it contains some kind of inlet opening 8 and corn shelling apparatus.

Corn shelling attachment 2 includes a shallow open-topped rectangular frame generally designated as 20. Frame 20 includes two longitudinally elongated side wall members 22. Side wall members 22 are connected at the front end by a front wall member 24 and at the bottom by a bottom wall member 26. Side wall members 22 are not connected together at their rear end and thus define an open rear end or rear opening 28. Triangular reinforcing braces or side plates 30 are connected to the top surface of each side wall member 22 adjacent their rear ends. Braces 30 are inclined rearwardly and are connected together at the top by a transversely extending support beam 32. A second similarly shaped support beam 34 is connected across the rear end of the side wall members 22 adjacent the bottom thereof. Together, the beams 32 and 34 constitute part of the means of detachably mounting the corn shelling attachment 2 on the front end 6 of combine 4.

The front end 6 of combine 4 has means for suspending the attachment 2 in the form of an L-shaped ledge generally indicated as 40. Ledge 40 has two upwardly extending tabs or flanges 42 at the front side 43 thereof. Effectively, each flange 42 defines a beam retaining means or clip along the front side 43 of the ledge 40. Ledge 40 is located transversely above the inlet opening 8. Ledge 40 also constitutes part of the means for detachably mounting or suspending the corn shelling attachment 2 on the front end 6 of combine 4, as will be described hereafter.

To pick up the corn shelling attachment 2, the customary crop picking header, normally attached to the front end 6 of combine 4 must be detached. The front end 6 of the combine 4 is then lowered until the ledge 40 is located beneath the bar 32 with the flanges 42 being located inside each of the triangular side braces 30. Then, when the front end 6 of combine 4 is raised, the ledge 40 will come up into engagement with the bar 32 with the flanges 42 being located in front of the bar 32. This is the primary means of detachably coupling the corn shelling attachment 2 to the combine 4. By virtue of the orientation of bar 32, the corn shelling attachment 2 will be securely supported in a cantilever orientation on the front end 6. In this orientation, the lower bar 34 will also be brought into engagement with front end 6 of combine 4. Bar 34 transversely extends out past the side wall members 22. These outer portions 35 of the bar 34 may also be clamped by means of U-shaped clamps or the like (not shown) on the front end 6 of combine 4 to further securely affix corn shelling attachment 2 to the combine 4. Although the bar 32 and ledge 40 are sufficient to support the weight of corn shelling attachment 2, the lower clamps (not shown) which engage bar 34 are useful primarily for when it is desired to drive the combine 4 from one location to another with corn shelling attachment 2 installed thereon.

The frame 20 of the corn shelling attachment 2 includes means for transporting unshelled corn, i.e. often called cob corn, through the open rear end 28 and into and through the opening 8. This transporting means includes a first conveying means generally indicated as 50. Conveying means 50 comprises a substantially horizontal apron 52 which extends between and is fixedly connected to the side wall members 22 of frame 20. Elongated conveyor chains 54 are journaled at either end on frame 20 on sprockets 56. Sprockets 56 are rotatably mounted on longitudinally spaced shafts 58. Four such conveyor chains 54 are preferably employed to define two transversely spaced chain conveyors 55. Between each of the conveyor chains 54 is a plurality of L-shaped pusher members generally indicated as 60. Pusher members 60 serve as slats to push the unshelled corn deposited onto the apron 52 toward the rear end 28 of the frame 20. Pusher members 60 on the respective chains 54 are longitudinally staggered relative to one another. For example, one pusher member on one of the chain conveyors 55 is located forwardly of the corresponding pusher member on the other chain conveyor. This staggering in the pusher members effects a better and more uniform feeding of the unshelled corn towards the rear end 28 of the frame 20.

In addition, the means for transporting the unshelled corn on frame 20 further includes means located adjacent the rear end of frame 20 for positively feeding the unshelled corn into and through the inlet opening 8. This positive feeding means includes a rotatable rotor generally indicated as 62. Rotor 62 is rotatably mounted on a shaft 64 adjacent the rear end 28 of the frame 20. Rotor 62 is located rearwardly past the rear or discharge end of the conveying means 50. Rotor 62 includes a cylindrical drum 65 having outwardly extending paddle arms 66 thereon. Two such paddle arms 66, each of which extend over approximately half of the length of the drum 65, are preferably employed. Paddle arms 66 are located 180° apart around the circumference of drum 64. Preferably, paddle arms 66 are made of a stiff rubber or other non-rigid material. Thus, paddle arms 66, although somewhat rigid in terms of contacting and dispensing the unshelled corn, still have some degree of flexibility. Thus, if the paddle arms 66 should become jammed against a pile of corn or some other obstruction, they can easily flex or bend to clear the obstruction. Consequently, the chances of damaging the paddle arms 66 of rotor 62 are minimized.

Shaft 64 is elongated and extends out through one of the side wall members 22. A small drive sprocket 70 is located on the outer end of the shaft 64. Drive sprocket 70 may be easily coupled by a chain (not shown) to a drive gear (not shown) located on the front end 6 of the combine. In addition, a drive sprocket or gear 72 is located on shaft 64 inboard of the main drive sprocket 70 and inside a gear box 74. Drive sprocket 72 is in driving engagement with a second sprocket 76 located on one of the shafts 58 on which conveyor chains 54 are journaled. Sprocket 72 is smaller than sprocket 76. Thus, the rotor 62 will rotate faster than the speed of the forward travel of the conveyor chains 54.

In the operation of the corn shelling attachment 2, once it has been mounted on the front of the combine 4 in the manner noted earlier, the only manual operation needed to place it into operative condition is to couple the main drive sprocket 70 by a chain to the drive sprocket on the front end of the combine. When shaft 64 is rotating, conveyor chains 54 will be moving unshelled cob corn placed onto the apron 52 towards the rear end 28 of the frame 20. This unshelled corn is placed onto the apron 52 simply by a laborer forking or otherwise shoveling the corn from a corn crib or the like down onto the apron. Other ways of placing the corn on the apron 52 could obviously be used. For example, an additional powered conveyor could be used to deposit the corn on the conveyor.

In any event, as the corn travels rearwardly on apron 52, it eventually will fall off the rear or discharge end of the conveying means 50. It then comes into engagement with the paddle arms 66. As noted, these paddle arms are sufficiently rigid to engage the corn cobs and sweep those corn cobs down and around the drum 65 and into and through the inlet opening. Because of the gear ratio between the rotor 62 and the conveyor chains 54, the rotor 62 is rotating at a faster speed than movement of the chains 54 to ensure that the corn does not pile up and jam rotor 62. Rotor 62 serves to engage the corn and move that corn through the inlet opening 8 into engagement with the corn shelling mechanism inside the combine. However, the paddle arms 66 are sufficiently flexible to allow them to bend to some degree if the space between the rotor 62 and the discharge end of the conveying means 50 should become jammed with corn cobs. Once the corn cobs have been placed into engagement with the corn shelling mechanism, that mechanism inside the combine is operative to shell the corn. The shelled corn can then be placed into any suitable wagon or similar support structure.

A flexible elongated flap or cover 80 is located between the front wall 24 of frame 20 and the top of the front of the conveying means 50. Flap 80 may be made of any suitable material. For example, flap 80 could be a piece of elongated rubber or the like. Flap 80 does not interfere with operation of the conveyor chains 54 because it is somewhat resilient. However, it does seal the space between the front end of the conveyor chains 54 and the front wall member 24 of frame 20. This prevents any unshelled corn from falling into the space.

Corn shelling attachment 2 of the present invention has a number of advantages. First of all, it can be directly mounted to the front end 6 of combine 4 in place of a normal header or other corn harvesting mechanism. In this regard, the header does not itself have to be operated to move the corn into the interior of the combine 4 to allow the combine to shell the corn. In addition, the means for detachably mounting the corn shelling attachment 2 to the combine 4, i.e. the bar 32 which rests on ledge 40 in back of the flanges 42, is extremely simple and easily operable. All that is required is that the operator of the combine 4 lower the front end 6 of combine 4 beneath the bar 32, and then raise the front end 6. This will then suspend the corn shelling attachment 2 from the front end 6 of combine 4 in a cantilever manner.

Moreover, the structure of the corn shelling attachment 2 is extremely simple and efficient in feeding the corn into the interior of combine 4. Conveyor chains 54 serve to move the unshelled corn rearwardly towards the inlet opening 8. In this regard, the conveying action of the conveyor chains 54 is enhanced by the staggered and offset arrangement of the pusher members 60. In addition, the rotatable rotor 28 firmly and positively engages and feeds the unshelled corn through the opening 81. Thus, it is ensured that the corn will be positively driven into and through the inlet opening 8 for engaging with the corn shelling mechanism of the combine.

Finally, the primary advantage of corn shelling attachment 2 is that a great deal of economy is achieved by utilizing the corn shelling capacity of combine 4 to a greater degree. With corn shelling attachment 2 it is not required that a separate sheller be rented or purchased by the farmer whenever it is desired to shell corn. All that is required is that the corn shelling attachment 2 be secured to the front end 6 of the combine 4 in place of the normal header thereon. Corn shelling attachment 2 is then operative to feed the corn into the combine 4 for utilization of the corn shelling mechanism in the combine. Thus, the economics of operating the farm having been improved since greater utilization of the combine 4 is now achieved.

Various modifications of this invention will be apparent to those skilled in the art. Thus, the scope of this invention is to be limited only by the appended claims.

I claim:

1. An auxiliary attachment for a combine, which combine has an inlet opening which operatively connects to a corn shelling apparatus located in the combine, which attachment comprises:
   (a) a frame;
   (b) means for detachably mounting the frame on the combine adjacent the inlet opening in a substantially horizontal orientation, wherein the detachable mounting means comprises:
      (i) a substantially horizontal and upwardly facing L-shaped ledge on the front of the combine above and adjacent to the inlet opening;

(ii) a transversely aranged beam located on the frame which is sufficiently wide to rest on the ledge in a mating face-to-face relationship; and (iii) a plurality of upwardly extending flanges on the front of the ledge which flanges extend vertically upwardly a sufficient distance such that they are located in front of the beam to retain the beam on the ledge, whereby the beam is dropped onto the ledge in back of the flanges to couple the frame to the combine;

(c) means carried on the frame for conveying corn towards the inlet opening; and (d) means carried on the frame adjacent the conveying means for positively feeding the corn through the inlet opening and into the corn shelling apparatus on the combine.

2. An auxiliary attachment as recited in claim 1, wherein the corn feeding means comprises a rotatable rotor having at least one radially extending paddle arm for engaging and directing the corn through the inlet opening.

3. An auxiliary attachment as recited in claim 2, wherein the rotor has at least two radially extending paddle arms which are oriented 180° apart from one another.

4. An auxiliary attachment as recited in claim 3, in which each of the paddle arms is flexible to allow the paddle arms to pass obstructions.

5. An auxiliary attachment as recited in claim 1, wherein the conveying means comprises:

(a) an apron fixedly carried in the frame; and (b) at least one chain conveyor rotatably journaled in the frame and having a plurality of transversely extending corn engaging slats, and wherein the slats are arranged for movement over the apron to carry corn lying on the apron towards the inlet opening.

6. An auxiliary attachment as recited in claim 5, wherein the conveying means includes two substantially identical chain conveyors arranged for movement over the apron.

7. An auxiliary attachment as recited in claim 6, in which the slats of the respective chain conveyors are longitudinally staggered over the apron relative to one another.

8. An auxiliary attachment as recited in claim 1, wherein the conveying means comprises at least one chain conveyor having a plurality of pusher members for moving the corn towards the inlet opening at a first speed; and wherein the corn feeding means comprises a rotatable rotor having at least one radially extending paddle arm, and wherein the tip of the paddle arm moves at a faster speed than the first speed of movement of the chain conveyor.

* * * * *